United States Patent [19]
Rjörk et al.

[11] 3,874,467
[45] Apr. 1, 1975

[54] BEAM SCALE

[75] Inventors: Bengt Rjörk; Bertil Gustafsson, both of Huskvarna; Leif Johansson, Nassjo, all of Sweden

[73] Assignee: AB Stathmos, Jonkoping, Sweden

[22] Filed: Feb. 7, 1974

[21] Appl. No.: 440,389

[30] Foreign Application Priority Data
Feb. 26, 1973 Sweden............................ 7302627

[52] U.S. Cl. .............................................. 177/250
[51] Int. Cl.................................................. G01g 1/36
[58] Field of Search ............ 177/235, 246, 247, 250, 177/252

[56] References Cited
UNITED STATES PATENTS
3,506,078  4/1970  Homs............................. 177/246 X Primary Examiner—George H. Miller, Jr.
Attorney, Agent, or Firm—Hubbell, Cohen & Stiefel

[57] ABSTRACT

A weighing machine in the form of a beam scale has a balance beam which is pivotable on an edge line. The balance beam comprises a bottom member which has a longitudinal channel in which a sliding weight is displaceable. The bottom portion of the channel is provided with a series of apertures, and the sliding weight has a projecting stud which is adapted to be selectively brought into engagement with any one of said apertures.

5 Claims, 2 Drawing Figures

BEAM SCALE

This invention relates to a weighing machine in the form of a beam scale comprising a balance beam which is pivotable on an edge line, and at least one sliding weight which is displaceable along the balance beam preferably at a right angle to the edge line.

In weighing machines of this kind according to the prior art, e.g. bathroom scales and household kitchen scales, the sliding weight was rotatable and displaceable along a rod or spindle, which passed through an eccentrically located through hole in the weight, and was provided with a projecting pointer or index, which was adapted to be selectively brought into engagement with a series of notches in the edge of a weight scale or meter extending parallel to the rod, under the influence of the rotating moment created by the eccentricity of the rod hole. For obvious reasons, said index or projection had to be located on the lower side of the weight which caused difficulties for the weighing person in determining when the projection was in engagement with the selected notch or recess of the weight scale. On account hereof it could easily happen that the sliding weight was inadvertantly misplaced, which resulted in an incorrect weighing value.

The principal object of the invention is to eliminate this and similar drawbacks of beam scales, and according to the invention this is achieved thanks to the fact that the weighing machine comprises a member, which is comprised in the balance beam and has a longitudinal channel in which said weight is displaceable.

Further features and advantages of the weighing machine will become apparent from the following detailed description and the annexed drawings, which diagrammatically and as non-limiting examples illustrate a presently preferred embodiment of the invention, and in which.

Figure 1:
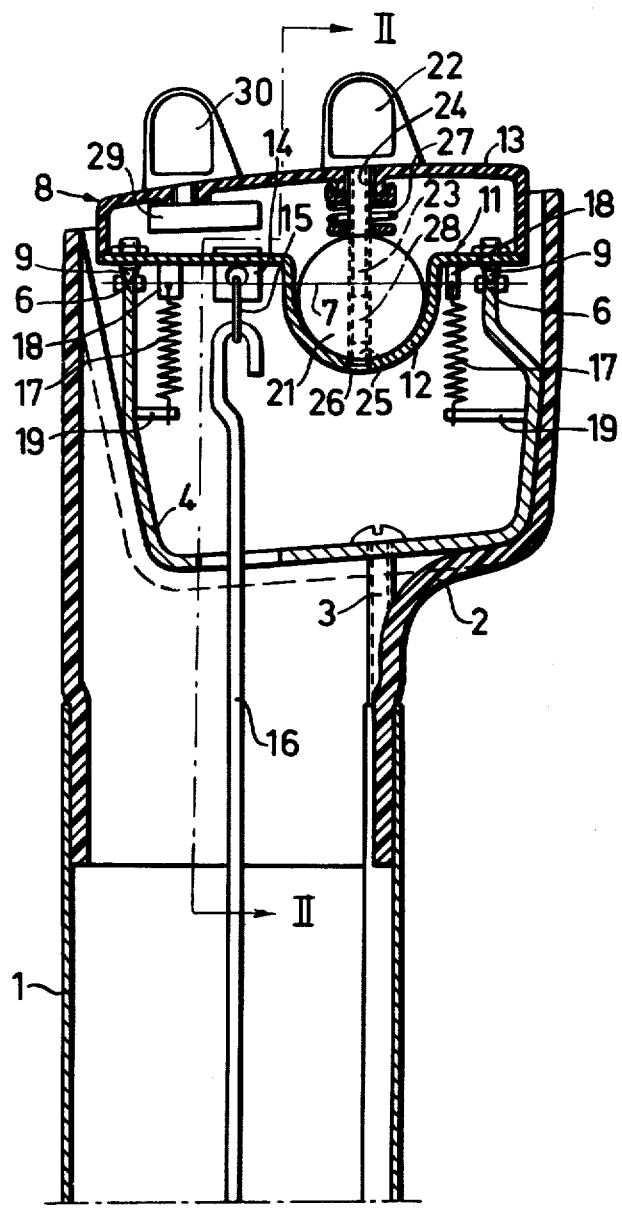
FIG. 1 is a vertical sectional view, substantially on line I — I in FIG. 2.
Figure 2:
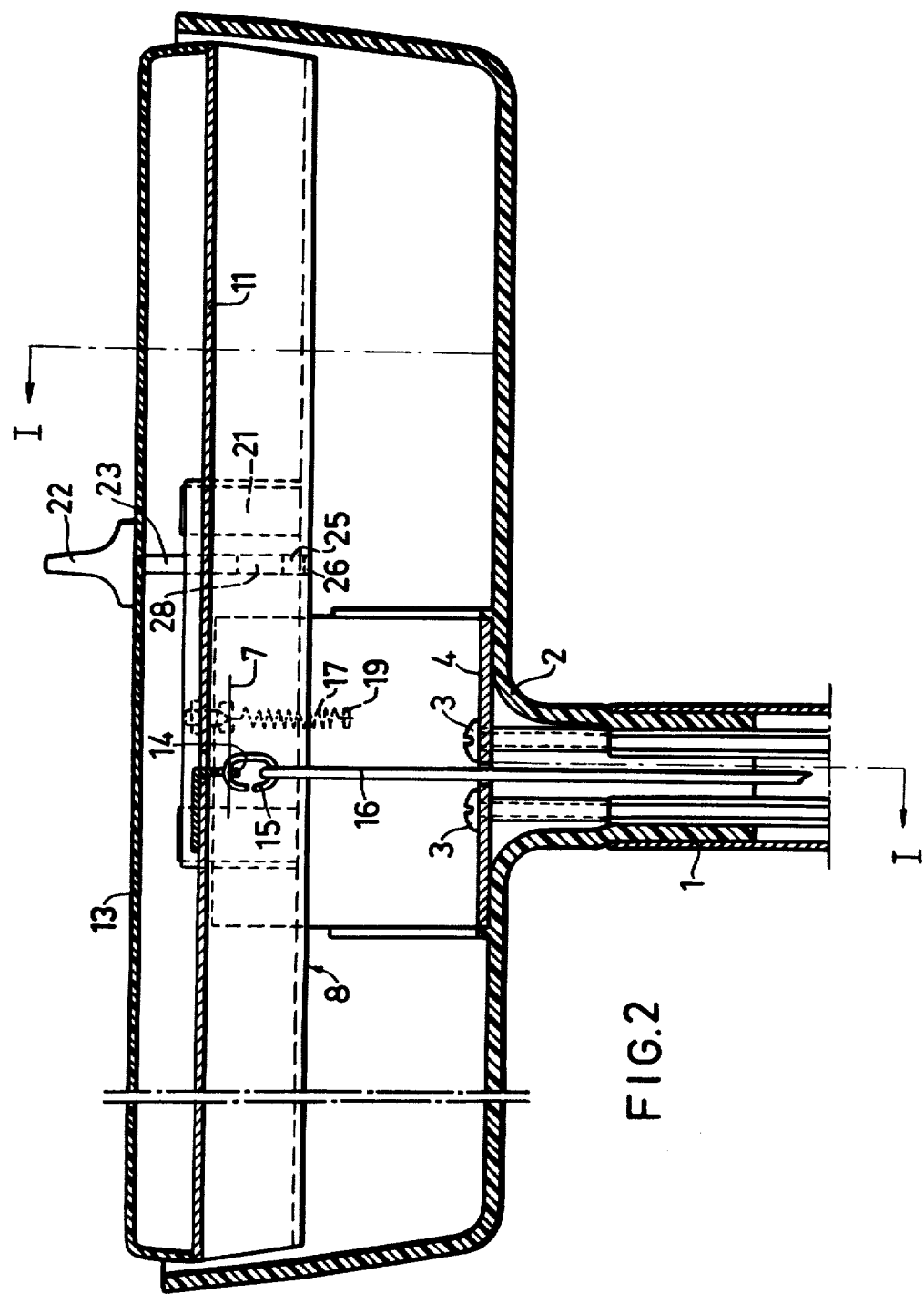
FIG. 2 is a vertical sectional view, substantially on line II — II in FIG. 1.

The Figures illustrate the upper portion of a bathroom scale having a substantially vertical post 1 which carries a shell of plastic or the like 2, which is secured to the post 1 by screws 3 under the intermediary of an insert 4. This insert 4 is provided with a pair of bearings 6, which define a knife-edge line 7 and which jointly carry a balance beam, which is generally designated by 8 and which is provided with a pair of knife-edges 9, each of which rests upon an individual one of the bearings 6.

The balance beam comprises a bottom portion 11 of sheet iron or the like, in which there is formed a longitudinal channel 12, and a lid or cover 13 of plastic or the like. In the bottom portion 11 there is provided a third bearing 14 which is also located on the knife-edge line 7 and supports a "knife-edge" 15 which is in engagement with a link rod 16, which transfers the weight or load from the weighing platform (not shown) to the balance beam 8.

The knife-edges 9 are pressed against their respective bearings 6 by means of tension springs 17 which are tightened between lugs 18 on the balance beam and studs or the like 19 on the insert member 4. According to the invention the channel 12 constitutes a guide for a sliding weight 21 which can be displaced along the channel and along a weight scale (not shown) extending parallel to the channel 12, by means of a finger grip 22, which is connected to the sliding weight by means of a stud 23, which extends through a slot 24 in the shell 8 and is screwed into a threaded hole in the sliding weight 21. Said hole in the sliding weight is suitably through, and in its other end a stud 25 is inserted which is adapted to be selectively brought into engagement with anyone of a series of apertures 26 which are provided after each other along the bottom of the channel 12 and which may each correspond to a multiple of 5 kgs. It is evident that the sliding weight 21 is intended to be displaced until the stud 25 is brought into engagement with that aperture 26 which is in closest agreement with but does not exceed the weight value to be determined. According to a preferred embodiment of the invention the sliding weight 21 is pressed towards the bottom of the channel, so that the peg or stud 25 will easier come into engagement with an aperture 26, by means of a spring 27 which is compressed between the sliding weight and the cover or shell 13 under the intermediary of a pair of washers.

According to a further development of the invention it is possible to introduce lead-shot or the like into that part 28 of the through hole which is located between the two studs 23 and 25, for precise adjustment of the gravity of the sliding weight 21.

29 designates a second sliding weight which, by means of a finger grip 30, is slidable along a second weight scale, the maximum value of which suitably corresponds to the difference in weight setting between two adjacent apertures 26 in the bottom of the channel 12. It is obvious that the weight of the person or object may be accurately determined by displacing this second sliding weight 29 until the weighing machine is into exact equilibrium.

The embodiment described above and shown in the drawings is, of course, to be regarded merely as a non-limiting example and may as to its details be modified in several ways within the scope of the following claims. Thus, for instance, the studs 13 and 29 may be inserted in individual holes in the sliding weight 21. Furthermore the number of displaceable sliding weights and weight scales therefore may be greater than two, e.g. three, respectively.

What we claim is:

1. In a beam scale having a balance beam which is pivotable on an edge line, and at least one sliding weight which is displaceable along the balance beam, the improvement comprising the balance beam having a longitudinal channel therein and a weight movably disposed within said channel.

2. Beam scale according to claim 1, in which the bottom portion of the channel is provided with a series of apertures, and in which the movable weight has a projecting stud which is selectively registrable with said apertures.

3. Beam scale according to claim 1 wherein said movable weight is slidable, and further comprising at least one spring for biasing the slidable weight in the direction towards the bottom of said channel.

4. Beam scale according to claim 1, wherein said balance beam comprises a shell overlying said channel and having a longitudinal slot extending substantially parallel to said channel, said weight being slidable in said channel, a finger grip which is located on the opposite side of the shell with respect to the slidable weight, a stud which projects through said slot in said shell and interconnects said slidable weight and said finger grip.

5. Beam scale according to claim 4, wherein said channel has a plurality of longitudinally spaced apertures in the bottom thereof, said weight has a vertically extending bore therethrough, and further comprising a second stud, said first and second studs being disposed within said bore, said second stud extending outwardly from the lower end of said weight and being selectively disposable within said apertures, said first stud extending outwardly from the upper end of said bore, said weight having a hollow chamber therein in communication with said bore for receiving additional weight therein to adjust the total weight of said movable weight.

\* \* \* \* \*